US011906154B2

(12) United States Patent
Irizarry et al.

(10) Patent No.: US 11,906,154 B2
(45) Date of Patent: Feb. 20, 2024

(54) LUMINAIRE WITH LENS HAVING A HOLOGRAPHIC THREE-DIMENSIONAL PATTERNED LAYER

(71) Applicant: SIGNIFY HOLDING B.V., Eindhoven (NL)

(72) Inventors: Andre Irizarry, Atlanta, GA (US); Westly Davis Hetrick, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/009,827

(22) PCT Filed: Jul. 20, 2021

(86) PCT No.: PCT/EP2021/070223

§ 371 (c)(1),
(2) Date: Dec. 12, 2022

(87) PCT Pub. No.: WO2022/018064

PCT Pub. Date: Jan. 27, 2022

(65) Prior Publication Data

US 2023/0220973 A1 Jul. 13, 2023

Related U.S. Application Data

(60) Provisional application No. 63/054,977, filed on Jul. 22, 2020.

(30) Foreign Application Priority Data

Sep. 7, 2020 (EP) .................................... 20194821

(51) Int. Cl.
*F21V 5/00* (2018.01)
*F21S 8/02* (2006.01)
(Continued)

(52) U.S. Cl.
CPC .............. *F21V 5/003* (2013.01); *F21S 8/026* (2013.01); *F21V 5/008* (2013.01); *F21V 17/002* (2013.01);
(Continued)

(58) Field of Classification Search
CPC ........ F21V 5/003; F21V 5/008; F21V 17/002; F21V 17/18; F21V 31/005; F21S 8/026; G09F 13/0413; G09F 2013/189
See application file for complete search history.

(56) References Cited

U.S. PATENT DOCUMENTS 7,298,533 B2 11/2007 Petersen et al.
10,012,352 B2 7/2018 Scribante et al.
(Continued)

FOREIGN PATENT DOCUMENTS

CN 106996545 A 8/2017
EP 2629136 A1 8/2013
(Continued)

*Primary Examiner* — Alan B Cariaso

(57) ABSTRACT

A luminaire includes a housing (102) with an inner cavity a light source (122) mounted to an inner top surface of the housing. The luminaire also includes a door frame (104), wherein the door frame includes a first side rail (108), a second side rail (109), a third side rail (107), and a fourth side rail (110). The four side rails of the door frame define a light emitting opening for the luminaire. A film stack (116) is supported by the door frame and placed in the light emitting opening so that light from the light source passes through the film stack as it is emitted through the light emitting opening. The film stack (116) includes a diffuser film (129) and a photopolymer film (127). The photopolymer film (127) is embossed with optical structures that create a holographic pattern that appears to be three-dimensional.

12 Claims, 8 Drawing Sheets

(51) Int. Cl.

| | |
|---|---|
| ***F21V 17/18*** | (2006.01) |
| ***F21V 31/00*** | (2006.01) |
| ***F21V 17/00*** | (2006.01) |
| ***G09F 13/04*** | (2006.01) |
| ***G09F 13/18*** | (2006.01) |

(52) U.S. Cl.
CPC ............ *F21V 17/18* (2013.01); *F21V 31/005* (2013.01); *G09F 13/0413* (2013.01); *G09F 2013/189* (2013.01)

(56) References Cited

U.S. PATENT DOCUMENTS

| | | | | |
|---|---|---|---|---|
| 10,585,229 | B1 * | 3/2020 | Lax | F21V 31/005 |
| 10,684,005 | B2 * | 6/2020 | Lee | F21V 17/002 |
| 2008/0084693 | A1 | 4/2008 | Shimada et al. | |
| 2014/0240980 | A1 | 8/2014 | Howe | |
| 2017/0221393 | A1 * | 8/2017 | Bhagavatula | G09F 13/18 |
| 2020/0370714 | A1 | 11/2020 | Teather et al. | |

FOREIGN PATENT DOCUMENTS

| | | | |
|---|---|---|---|
| KR | 20080106656 | A | 12/2008 |
| WO | 2014045147 | A1 | 3/2014 |

* cited by examiner

LUMINAIRE WITH LENS HAVING A HOLOGRAPHIC THREE-DIMENSIONAL PATTERNED LAYER

CROSS-REFERENCE TO PRIOR APPLICATIONS

This application is the U.S. National Phase application under 35 U.S.C. § 371 of International Application No. PCT/EP2021/070223, filed on Jul. 20, 2021, which claims the benefit of European Patent Application No. 20194821.3, filed on Sep. 7, 2020, and U.S. Provisional Patent Application No. 63/054,977, filed on Jul. 22, 2020. These applications are hereby incorporated by reference herein.

TECHNICAL FIELD

Embodiments described herein relate generally to light fixtures, and more particularly to systems, methods, and devices for a luminaire with a lens having a three-dimensional patterned layer.

BACKGROUND

When compared to conventional lighting technologies, such as incandescent, fluorescent, halogen, metal halide, or high pressure sodium light sources, light emitting diodes (LEDs) offer substantial benefits associated with their energy efficiency, light quality, and compact size. However, new technologies can help to realize the full potential benefits offered by light emitting diodes. For example, technologies that allow control over the direction of light emitted from LEDs would be beneficial. Additionally, technologies that permit luminaires to have unique patterns illuminated by LEDs would also be beneficial.

SUMMARY

In one example embodiment, the present disclosure provides a luminaire with a lens that comprises at least one layer or film, the lens displaying a three-dimensional holographic pattern when illuminated. The luminaire comprises a housing that defines a cavity. The housing comprises an inner top surface to which a light source is mounted. The luminaire further comprises a frame attached to the housing. The frame can surround a light emitting opening of the luminaire. The lens is disposed in the light emitting opening and can be supported by the frame. The lens can comprise at least one layer that receives light emitted by the light source and processes the light for emission through the light emitting opening of the luminaire. The at least one layer of the lens can comprise a photopolymer layer. The photopolymer layer can be embossed with a pattern of optical structures. The pattern of optical structures appears as a three-dimensional pattern when the lens is illuminated by the light source.

In another example embodiment, the present disclosure provides a luminaire with a lens that displays a pattern on the lens when illuminated. The luminaire comprises a housing that defines a cavity. The housing comprises an inner top surface to which a light source is mounted. The luminaire further comprises a frame attached to the housing. The frame can comprise four side rails that surround a light emitting opening of the luminaire. A lens is disposed in the light emitting opening and can be supported by the frame. The lens can comprise a diffuser layer, a photopolymer layer, and a textured acrylic layer. The lens receives light emitted by the light source and processes the light for emission through the light emitting opening of the luminaire. The photopolymer layer can be embossed with a pattern of optical structures. The pattern of optical structures appears as a three-dimensional pattern when the lens is illuminated by the light source.

In another example embodiment, the present disclosure provides an approach for retrofitting a luminaire that comprises a frame with a lens. The luminaire comprises a housing that defines a cavity. The housing comprises an inner top surface to which a light source is mounted. The frame can surround a light emitting opening of the luminaire. The frame with the lens can be removed and replaced with a replacement frame comprising a lens that displays a three-dimensional holographic pattern when illuminated. The lens is disposed in the light emitting opening and can be supported by the replacement frame. The lens can comprise at least one layer that is a photopolymer layer. The lens receives light emitted by the light source and processes the light for emission through the light emitting opening of the luminaire. The photopolymer layer can be embossed with a pattern of optical structures. The pattern of optical structures appears as a holographic three-dimensional pattern when the lens is illuminated by the light source.

In another example embodiment, the present disclosure provides a luminaire with a lens that is a film stack, where the film stack displays a pattern on the film stack when illuminated. The luminaire comprises a housing that defines a cavity. The housing comprises an inner top surface to which a light source is mounted. The luminaire further comprises a door frame attached to the housing. The door frame can comprise four side rails that surround a light emitting opening of the luminaire. A film stack is disposed in the light emitting opening and can be supported by the door frame. The film stack can comprise a diffuser film and a photopolymer film. The plurality of films receive light emitted by the light source and process the light for emission through the light emitting opening of the luminaire. The photopolymer film can be embossed with a pattern of optical structures. The pattern of optical structures appears as a three-dimensional pattern when the film stack is illuminated by the light source. The door frame can comprise a first side rail, a second side rail, a third side rail, and a fourth side rail. The door frame can be positioned within the housing so that the first side rail fits into a first housing recess and the second side rail fits into a second housing recess. The four side rails of the door frame can be joined to surround the light emitting opening. Each of the four side rails can comprise a back flange and a front flange, wherein the back flange and the front flange are joined by a sidewall. A perimeter of the film stack can be placed between the back flange and the front flange of each of the four side rails of the door frame.

In another example embodiment, the present disclosure provides a luminaire with a lens that is a film stack, where the film stack displays a pattern on the film stack when illuminated. The luminaire comprises a housing that defines a cavity. The housing comprises an inner top surface to which a light source is mounted. The luminaire further comprises a door frame attached to the housing. The door frame can surround a light emitting opening of the luminaire. A film stack is disposed in the light emitting opening and can be supported by the door frame. The film stack can comprise a diffuser film and a photopolymer film. The film stack receives light emitted by the light source and processes the light for emission through the light emitting opening of the luminaire. The photopolymer film can be embossed with a pattern of optical structures. The pattern of optical structures appears as a holographic three-dimensional pattern when the film stack is illuminated by the light source. The door frame can comprise a first side rail, a second side rail, a third side rail, and a fourth side rail. Each of the four side rails can comprise a back flange and a front flange, wherein the back flange and the front flange are joined by a sidewall. The front flange can comprise a horizontal portion and an angled portion. The horizontal portion can have an outer surface that is parallel with a plane defined by the light emitting opening of the housing. The angled portion can define an outer acute angle between an outer surface of the angled portion and the plane defined by the light emitting opening of the housing. The angled portion can also define an inner obtuse angle between an inner surface of the horizontal portion of the front flange and an inner surface of the angled portion. A perimeter of the film stack can be placed between the back flange and the front flange of each of the four side rails of the door frame.

These and other aspects, objects, features, and embodiments, will be apparent from the following description and the appended claims.

BRIEF DESCRIPTION OF THE DRAWINGS

The drawings illustrate only example embodiments and are therefore not to be considered limiting and may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
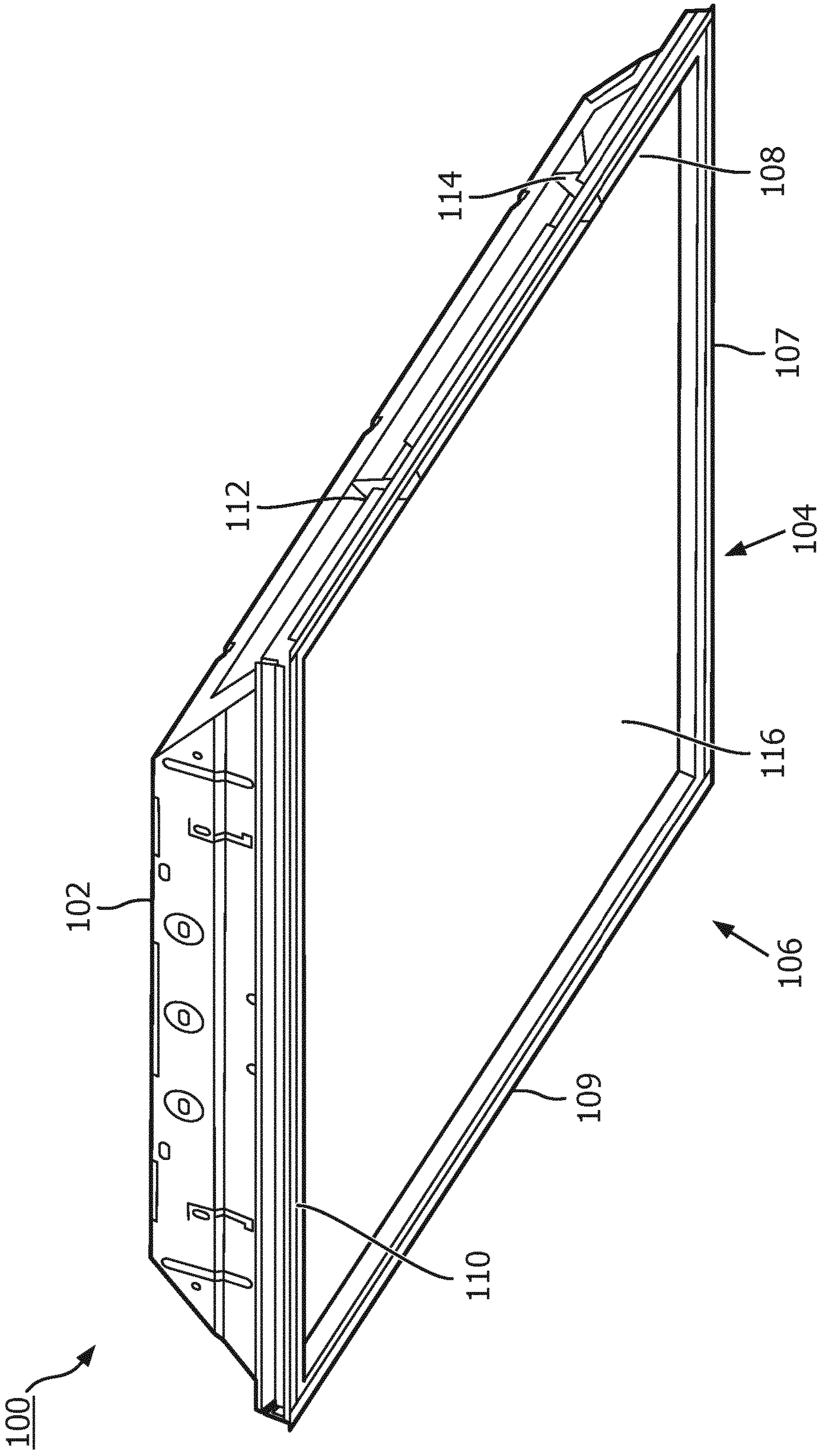
FIG. 1 illustrates a bottom perspective view of a luminaire in accordance with certain example embodiments.

The example embodiments discussed herein are directed to luminaires such as troffer luminaires that are typically recessed into a ceiling. While the example embodiments described herein are directed to recessed troffer luminaires, it should be understood that the embodiments described herein can apply to a variety of luminaires. For instance, the example embodiments can be directed to other types of luminaires, including but not limited to surface mounted luminaires, suspended luminaires, highbay luminaires, downlight luminaires, emergency lighting, task lighting, and outdoor luminaires. The example embodiments described herein can be used with luminaires located in any environment (e.g., indoor, outdoor, hazardous, non-hazardous, high humidity, low temperature, corrosive, sterile, high vibration). Further, the luminaires described herein can use one or more of a number of different types of light sources, including but not limited to various light-emitting diode (LED) light sources such as discrete LEDs, LED arrays, chip on board LEDs, and organic LED light sources, as well as other types of light sources. Therefore, the example luminaires described herein, should not be considered limited to a particular type of light source.

The example embodiments described herein are directed to a luminaire that comprises a housing and a frame that attaches to the housing. The frame can support a lens comprising at least one layer. The lens can modify light that is emitted from the luminaire. The lens can include a photopolymer layer with optical structures. The photopolymer layer is created by embossing the photopolymer layer with a tool that creates the optical structures in the photopolymer layer. The photopolymer layer is then cured using, for example, ultraviolet light or another curing method. In one example embodiment, the optical structures in the photopolymer layer are an array of prisms designed to create a holographic three-dimensional pattern in the photopolymer layer.

The holographic three-dimensional pattern in the photopolymer layer can then be used in a variety of applications in luminaires. As one example, it can be desirable to have holographic three-dimensional patterns in luminaires for various aesthetic reasons. The holographic three-dimensional patterns in the luminaires can be customized to meet a particular customer's needs. For instance, the holographic three-dimensional pattern in the luminaires can match patterns or designs of other décor in a room.

As another example, holographic three-dimensional patterns in a luminaire can be used to display a logo or a symbol. For instance, holographic three-dimensional patterns in a luminaire can be used to convey a message or to serve as a sign.

In some example luminaires disclosed herein, the frame supporting the lens can be easily removed from the housing. Such removable frames can be referred to as a door frame. With the flexibility provided by a removable frame, luminaires can be designed so that different door frames containing lenses with different patterns can easily be swapped into and out of a luminaire. In the context of an existing installed recessed troffer luminaire, the embodiments described herein provide the ability to easily retrofit the existing installed recessed troffer luminaire with a replacement door frame providing a new holographic three-dimensional pattern created by a different lens or film stack. The existing door frame having an existing lens and illumination pattern can be removed from the existing installed luminaire housing without removing the entire housing from the ceiling or other installation. After removing the existing door frame and lens, the replacement door frame having a different film stack with a desired holographic three-dimensional pattern can then be installed into the existing luminaire housing. The ability to easily retrofit existing luminaires with a replacement door frame having a desired holographic three-dimensional pattern is another advantage of the embodiments described herein.

Figure 2:
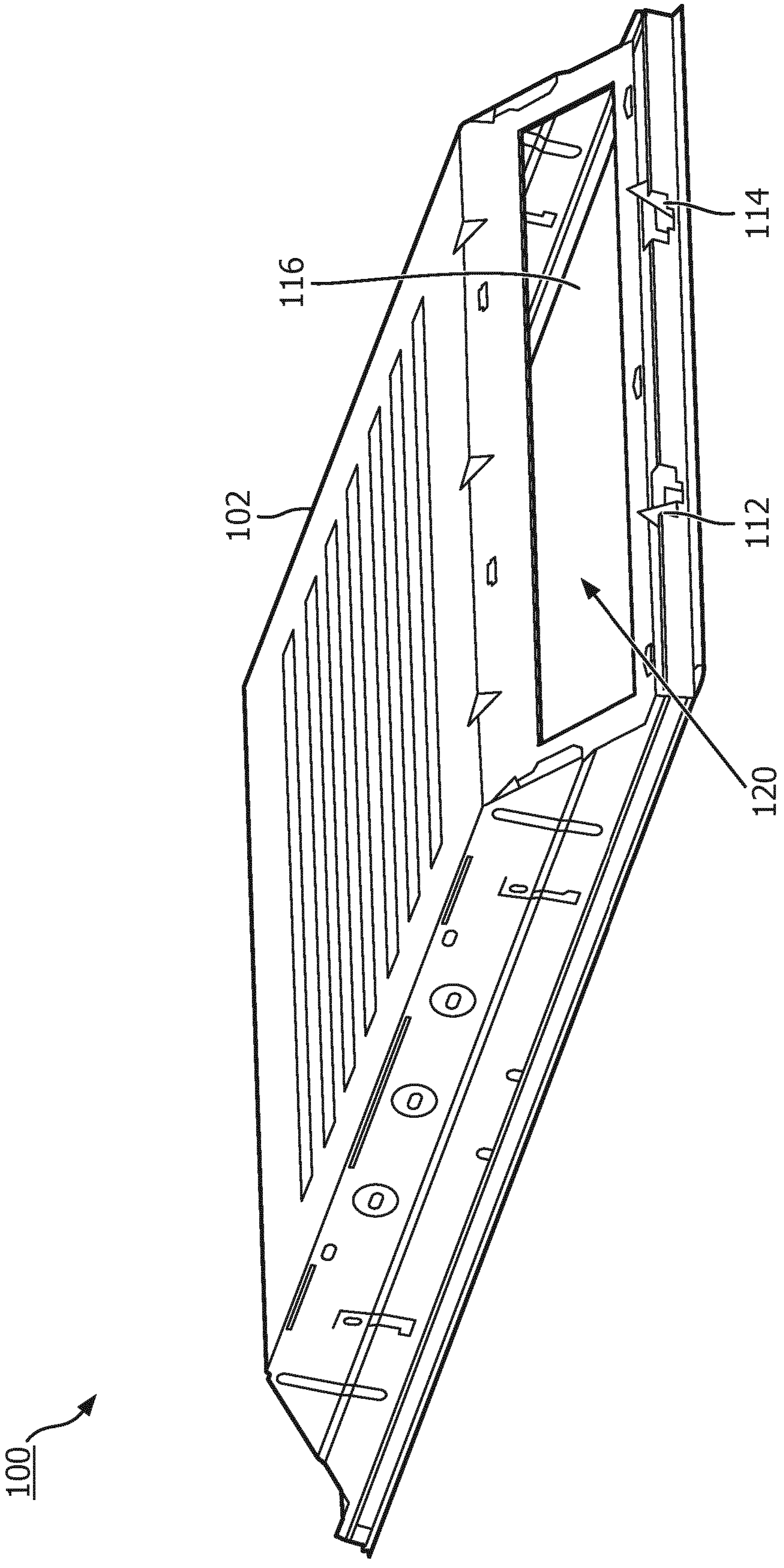
FIG. 2 illustrates a top perspective view of the luminaire in accordance with certain example embodiments.
Figure 3:
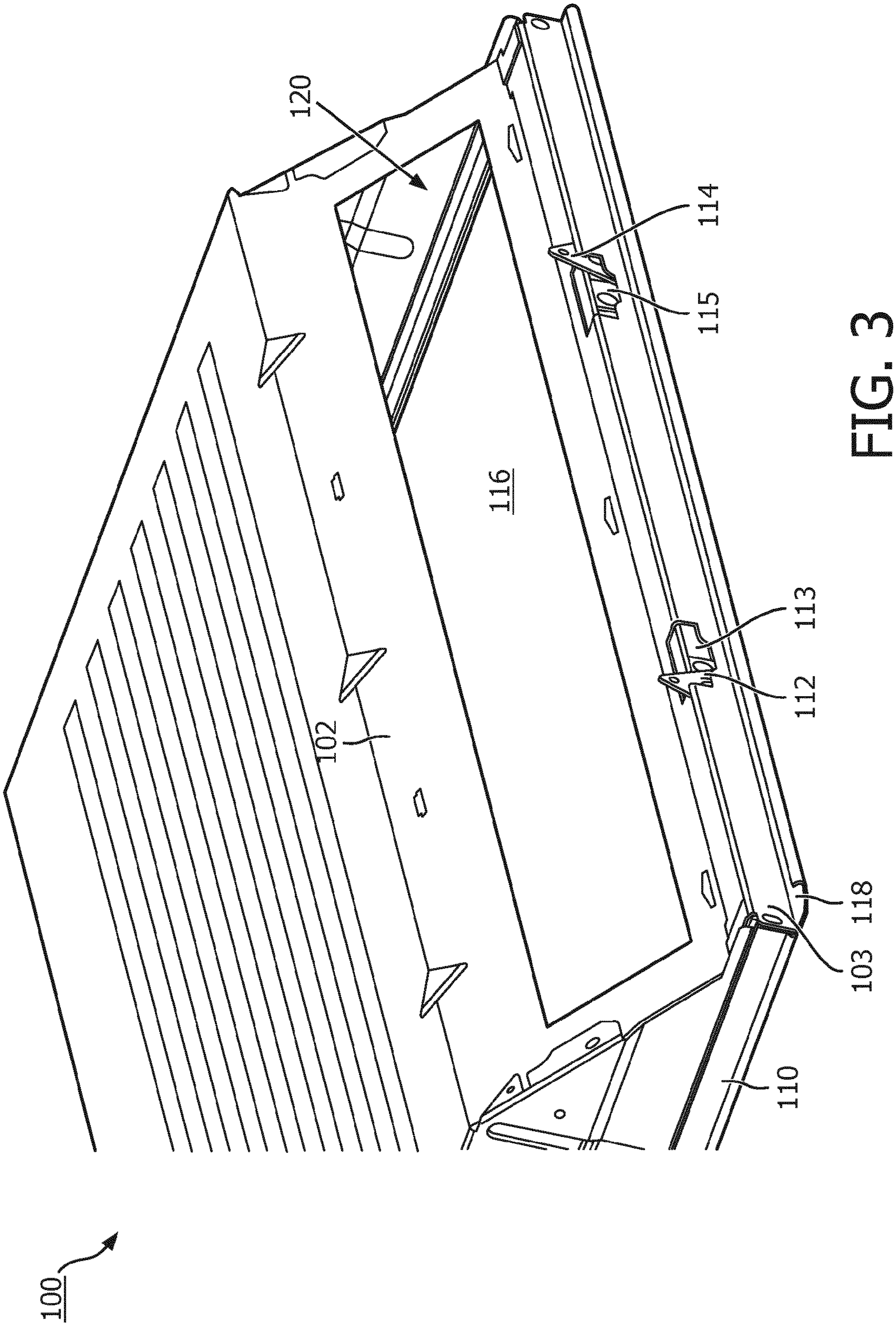
FIG. 3 illustrates an enlarged top perspective view of a portion of the luminaire in accordance with certain example embodiments.
Figure 4:
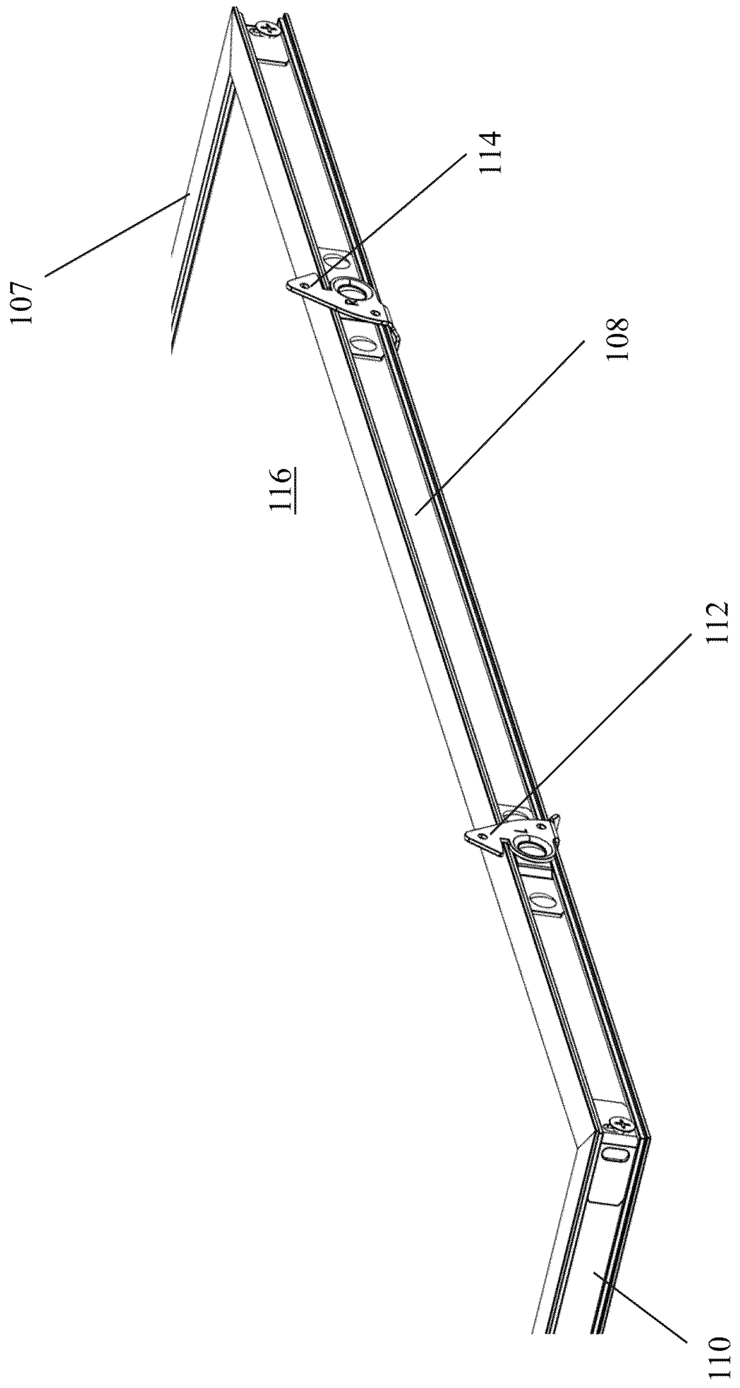
FIG. 4 illustrates an enlarged top perspective view of a portion of the door frame and film stack of the luminaire in accordance with certain example embodiments.
Figure 5:
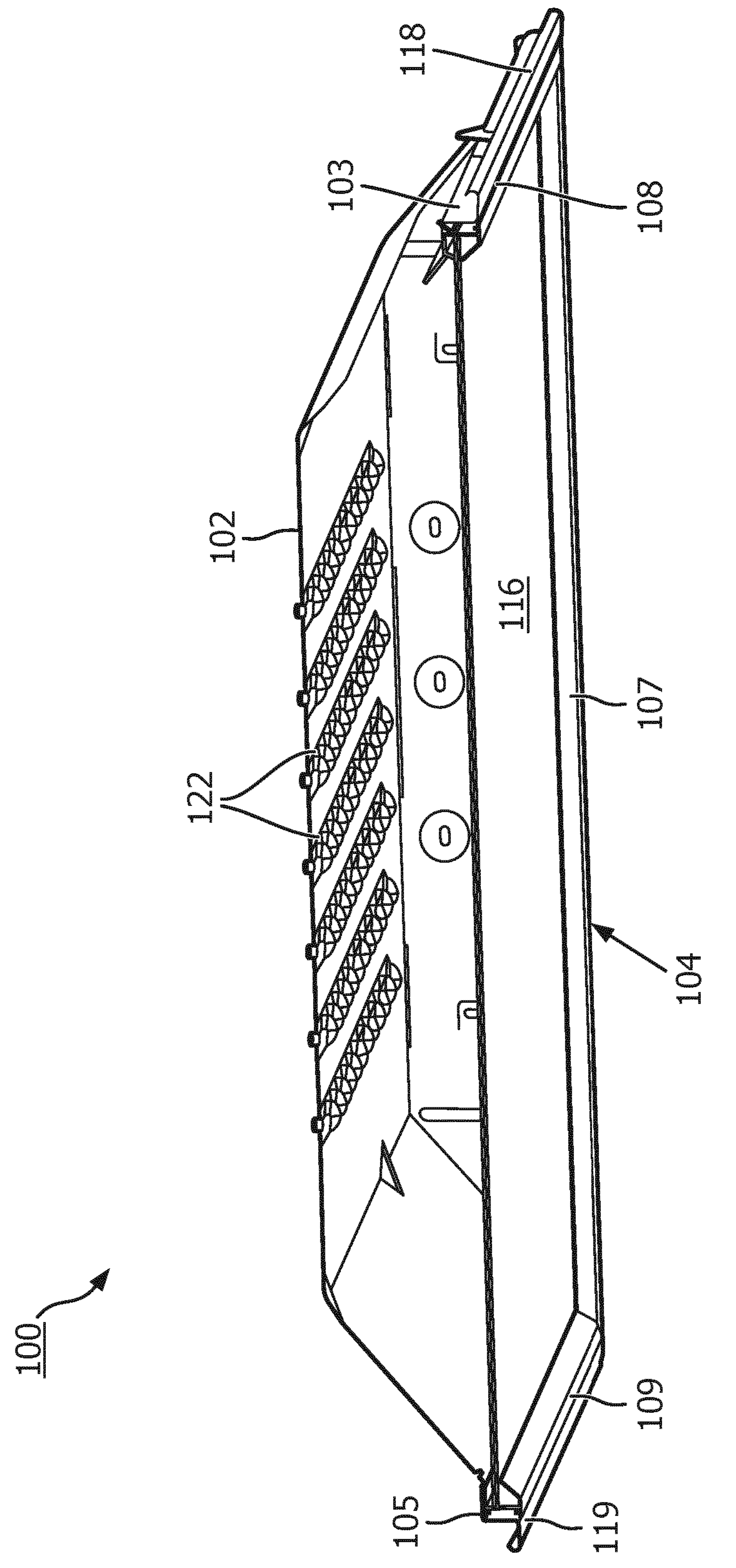
FIG. 5 illustrates a cross-sectional view of the luminaire in accordance with certain example embodiments.
Figure 6:
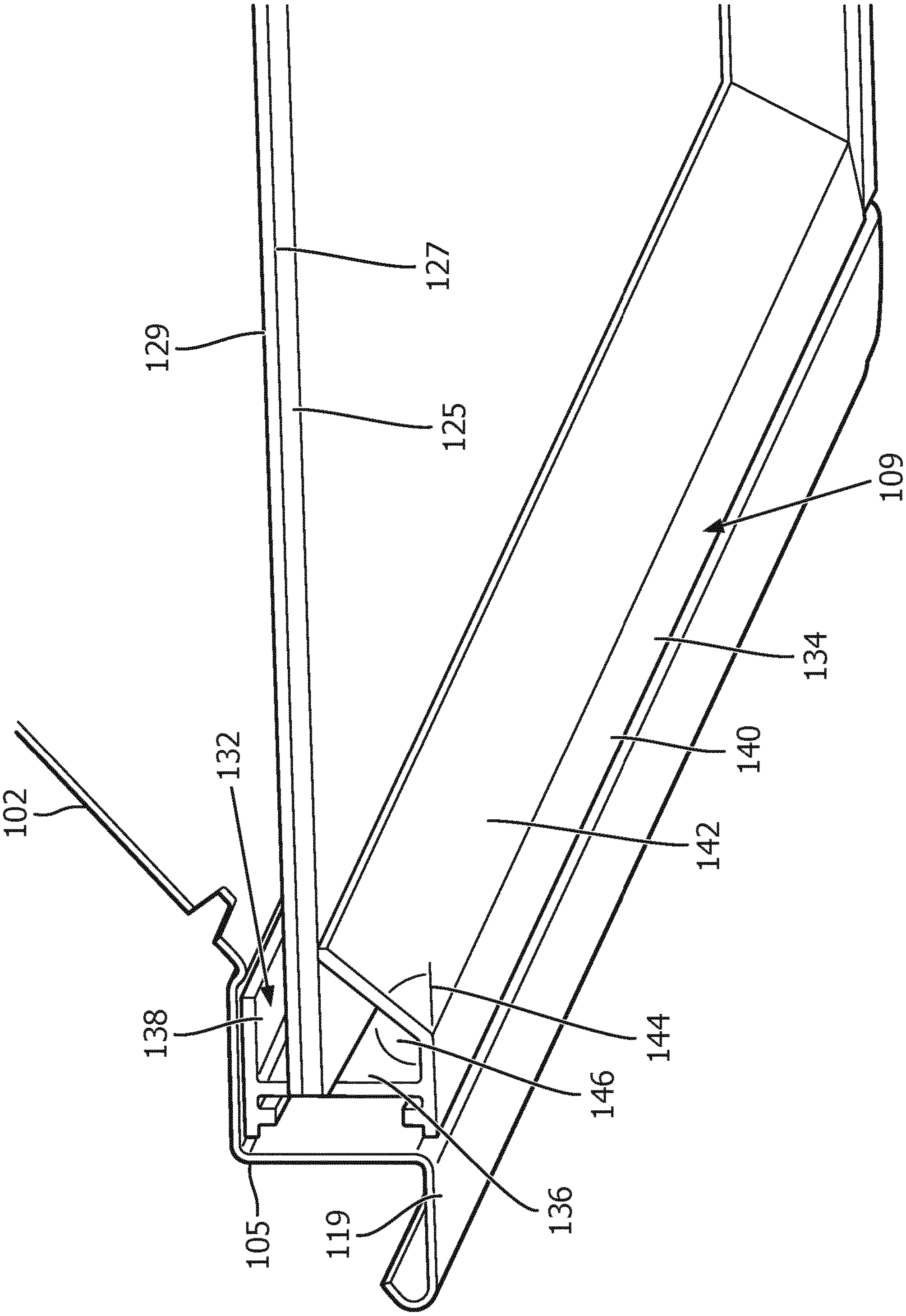
FIG. 6 illustrates an enlarged cross-sectional view of a portion of the luminaire in accordance with certain example embodiments.

Referring now to FIGS. 1-6, an example luminaire will be described in greater detail. It should be understood that the luminaire illustrated in FIGS. 1-6 is a non-limiting example and that lenses with holographic three-dimensional patterns can be implemented in other types of luminaires. The example luminaire illustrated in FIGS. 1-6 is a troffer luminaire that would typically be recessed in a ceiling or other structure. FIG. 1 illustrates a bottom perspective view of a troffer luminaire 100. FIG. 2 illustrates a top perspective view of the troffer luminaire 100 and FIG. 3 illustrates an enlarged top perspective view of a portion of the troffer luminaire 100. FIG. 4 illustrates an enlarged top perspective view of a portion of the door frame of the luminaire 100. FIG. 5 illustrates a cross-sectional view of the luminaire 100 and FIG. 6 illustrates an enlarged cross-sectional view of a portion of the luminaire 100.

The troffer luminaire 100 comprises a housing 102 that would typically be recessed into a ceiling or other structure. The housing 102 defines an inner cavity in which a light source is disposed. The housing 102 comprises a top portion with two slanted sides. Extending from a first slanted side is a first housing recess 103 and a first outer flange 118 and extending from the opposite second slanted side is a second housing recess 105 and a second outer flange 119. As illustrated in FIGS. 1 and 2, the two other ends of the housing 102 are enclosed with a first end plate on a first end and on the second opposite end a second end plate.

As illustrated in FIGS. 2 and 3, the first slanted side of the top portion of the housing can have a housing aperture 120 where a power supply can be mounted. Certain light sources such as LED light sources and fluorescent light sources require regulated power and, in those cases, the light sources can receive regulated power from the power supply attached to the housing. As non-limiting examples, the power supply can comprise one or more of a driver, a ballast, a switched mode power supply, an AC to DC converter, a DC to DC converter, a transformer, or a rectifier that can provide regulated power to the light source. In alternate embodiments, a power supply may not be attached to the housing and instead can be located remotely from the luminaire, such as in a plenum space above the ceiling. The power supply can include class 1 wiring connections for receiving power (e.g. 120 VAC, 240 VAC) of a power source, such as the electrical grid, via a power cable. The power supply can also include class 2 wiring connections for supplying electrical power (e.g. 20 VDC to 60 VDC) to the light source within the housing.

Example luminaire 100 also comprises a removable door frame 104. As explained previously, the removability of the frame is optional and in alternate embodiments the frame may be fixed in the luminaire housing. In example luminaire 100, the door frame 104 comprises four side rails, namely a first side rail 108, a second side rail 109, a third side rail 107, and a fourth side rail 110. The four side rails of the door frame 104 are joined at their corners. In the example of FIGS. 1-4, the four side rails are joined at their corners by corner brackets and, optionally, fasteners. The four side rails of the door frame 104 form a light emitting opening 106. The door frame 104 is attached to the bottom perimeter of the housing 102. It should be understood that in alternate embodiments the door frame can take other forms. For example, the four side rails of the door frame could comprise one continuous frame that does not require corner brackets for joining the side rails. As another example, the door frame can have shapes other than rectangular, including but not limited to circular or triangular.

The door frame 104 can be attached to the housing 102 with any of a variety of coupling mechanisms. In the example shown in FIGS. 1-6, the door frame is attached to the housing along the first side rail 108 using a first latch 112 and a second latch 114. As illustrated in FIGS. 3 and 4, the first latch 112 and the second latch 114 are attached to the first side rail 108. When attached to the housing 102, the first latch 112 is positioned through a first housing slot 113 and the second latch 114 is positioned through a second housing slot 115. When positioned in the first housing slot 113 and the second housing slot 115, the first latch 112 and the second latch 114 can pivot and engage the back side of the housing 102 and secure the door frame 104 to the housing 102. The second side rail 109 can be attached to the housing using similar latches, a hinge, or any of a variety of other coupling mechanisms. Disposed in the light emitting opening 106 of the door frame 104 is a lens. In the example embodiments described herein, the lens can comprise one or more layers, wherein at least one layer is a photopolymer with optical structures. As explained above, the optical structures are embossed on the photopolymer layer using a tool and then the photopolymer layer is cured. The optical structures of the photopolymer layer can be prisms or other features that create a holographic three-dimensional pattern when light passes through the photopolymer layer. The photopolymer layer can be described as a film. Alternatively, the photopolymer layer can be a laminate placed on another layer or film.

As described previously, the lens disposed in the door frame 104 can comprise one or more layers. In the example luminaire 100, the lens is a film stack 116 comprising a plurality of films. At least one of the films of the plurality of films is a diffusing film that diffuses light emitted from the light source within the housing. At least another film of the plurality of films is the photopolymer film with optical structures. The plurality of films can also include one or more other layers of film that process the light emitted from the luminaire in a desired manner. As described further below in connection with FIG. 6, the lens can include one or more layers disposed on top of or below the photopolymer layer.

Referring now to FIG. 5, a cross-sectional view of the luminaire 100 is shown. The cross-sectional view of the luminaire 100 shows the inner cavity within the housing 102. A light source 122 is mounted to the inner top surface of the top portion of the housing 102. In the example shown in FIG. 5, the light source 122 is an array of discrete light emitting diodes. However, in other embodiments, the light source can be other types of light emitting diodes, organic light emitting diodes, or any other type of light source. Mounting the light source to the inner top surface of the housing 102 for a “back lit” arrangement optimizes the distribution of light as the light passes through the film stack 116. In other words, mounting the light source to the inner top surface of the housing 102 is preferable to other arrangements for the light source such as an edge lit arrangement where light emitting diodes are mounted along the narrow edge of a light guide. The back lit arrangement of the light source allows the light to be more uniformly diffused as it passes through the film stack and enables the photopolymer film to provide a more uniform holographic three-dimensional pattern.

The cross-sectional view provided in FIG. 5 also illustrates the position of the door frame 104 within the housing 102. When the door frame 104 is attached to the housing 102, the first side rail 108 is disposed in the first housing recess 103 and the second side rail 109 is disposed in the second housing recess 105. Additionally, as will be described further in connection with FIG. 6, the film stack 116 is supported by the door frame 104 and is recessed into the door frame 104 and the housing 102.

Referring now to FIG. 6, a portion of the example luminaire 100 is shown in cross section. As can be seen in FIG. 6, the film stack 116 is supported by the side rails of the door frame 104. In the portion shown in FIG. 6, the film stack 116 is supported by second side rail 109. In example luminaire 100, each of the four side rails has a construction similar to that of second side rail 109. Referencing second side rail 109 as an example, it comprises a back flange 138, a side wall 136, and a front flange 134. The second side rail 109 fits into second housing recess 105 so that the front flange 134 is co-planar with second outer flange 119 of the housing 102. As can be seen in FIGS. 3 and 5, the first side rail 108 is similarly situated in first housing recess 103 so that the front flange of the first side rail 108 is co-planar with the first outer flange 118 of the housing 102. The co-planar arrangement of the first side rail 108 with the first outer flange 118 and the second side rail 109 with he second outer flange 119 minimizes shadows and optimizes the appearance of the holographic three-dimensional pattern created by the film stack 116.

The design of the side rails further serves to minimize shadows and optimize the appearance of the holographic three-dimensional pattern created by the film stack 116. As shown in FIG. 6, the film stack 116 is supported by the door frame 104 by placing a perimeter of the film stack 116 on the front flange 134 of the second side rail 109. The film stack 116 is similarly situated on the front flange of each of the other side rails. Resting the film stack 116 on the front flange of each side rail assists in minimizing shadows and creating a uniform appearance of the holographic three-dimensional pattern created by the film stack 116. As shown in FIG. 6, a gap 132 is present between a top of the film stack 116 and a bottom surface of back flange 138. The gap 132 can be filled with a gasket or other material to secure the film stack 116 in place within the door frame 104.

An additional feature of the second side rail 109 is the shape of the front flange 134. As illustrated in FIG. 6, the front flange is shaped to provide a taper to the light emitting opening 106. The shape of the front flange further assists in minimizing shadows that might appear on the film stack 116 and optimizing the appearance of the holographic three-dimensional pattern. As shown in detail in FIG. 6, the front flange 134 comprises a horizontal portion 140 and an angled portion 142. The horizontal portion 140 is co-planar or substantially co-planar with the second outer flange 119. The angled portion 142 extends from an end of the horizontal portion 140 upward toward the film stack 116. The angled portion 142 of the front flange 134 defines an outer acute angle 144 between an outer surface of the angled portion 142 and a plane defined by the light emitting opening 106. The angled portion 142 further defines an inner obtuse angle 146 between an inner surface of the horizontal portion 140 and an inner surface of the angled portion 142.

The details of the example film stack 116 are also shown in FIG. 6. Specifically, the example film stack 116 comprises a diffuser film 129, a photopolymer film 127, and an acrylic film 125. In alternate embodiments, the film stack 116 may only include the photopolymer film 127. In another example embodiment, the film stack 116 may only include the diffuser film 129 and the photopolymer film 127. In yet other embodiments, the acrylic film 125 can be replaced by a film of another material. It should be understood that in example embodiments with multiple layers, the photopolymer layer can be disposed on a top side or bottom side of another layer such as a diffuser layer. Additionally, although the layers are referred to as films in the foregoing example, it should be understood that the lens can take other forms and can comprise one or more layers as a laminate, panel, or other structure.

Referring again to the example embodiment of FIG. 6, as light is emitted by the light source 122 it is first diffused by the diffuser film 129. After passing through the diffuser film 129, the light is diffracted by the optical structures embedded in the photopolymer film 127 to create the holographic three-dimensional pattern. If the optional acrylic film 125 is included in the film stack, it can further diffuse the light passing through the photopolymer film 127. After passing through the optional acrylic film 125, the light exits the luminaire through the light emitting opening 106 of the luminaire 100.

The acrylic film 125 may be textured to minimize glare as light is emitted from the luminaire. The diffuser film 129 can be made from acrylic or other materials that diffuse the light emitted from the light source 122. As described previously, the photopolymer film 127 comprises the optical structures that create the holographic three-dimensional pattern. In one example, the optical structures can be tiny prisms arranged to create the desired holographic three-dimensional pattern. When viewed by a person standing below the installed luminaire 100, the detail of the optical structures in the photopolymer film 127 is not discernable and instead the person sees the holographic three-dimensional pattern created by the optical structures of the photopolymer film 127.

Figure 7:
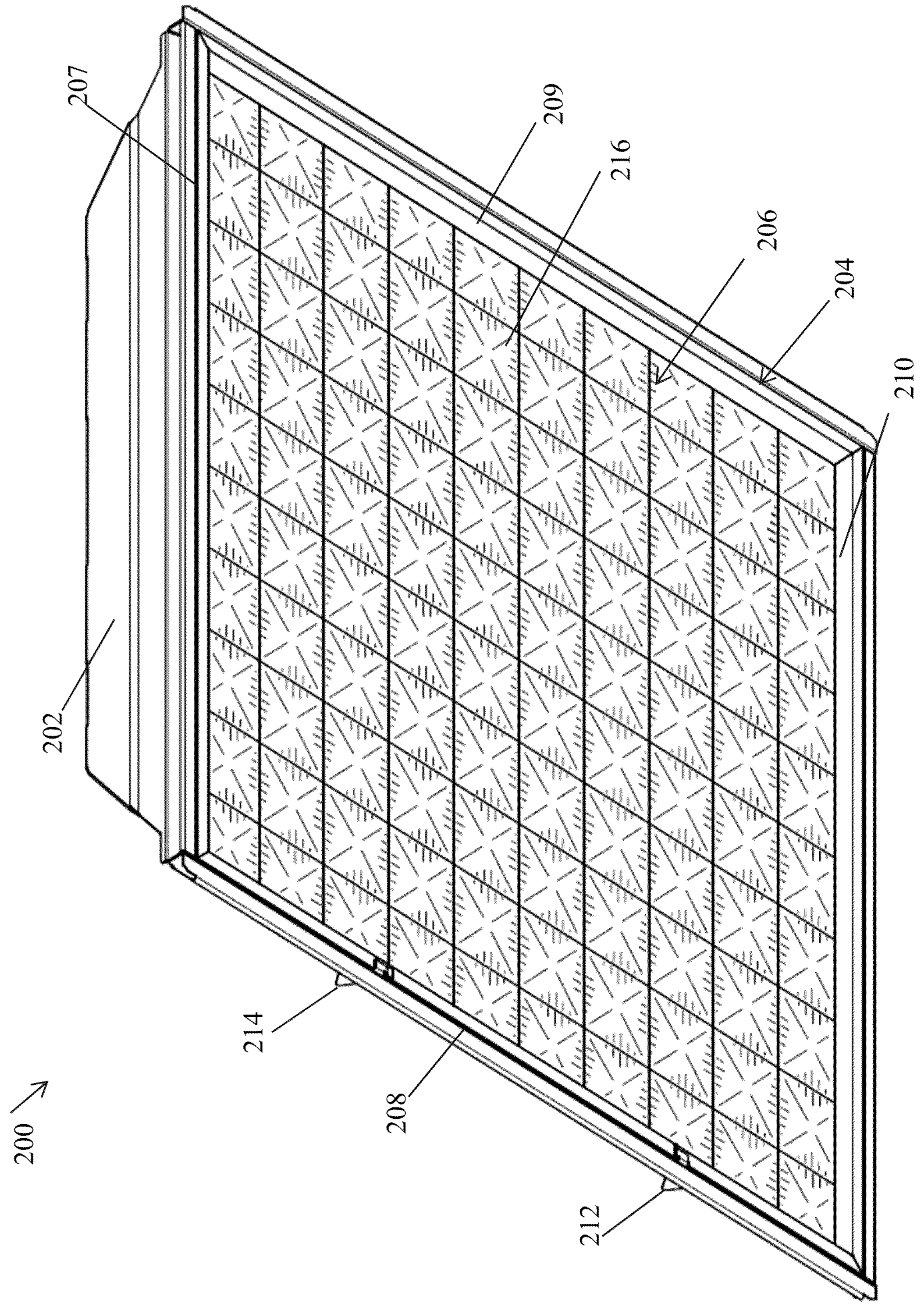
FIG. 7 illustrates a bottom perspective view of a luminaire with a three-dimensional pattern in accordance with certain example embodiments.
Figure 8:
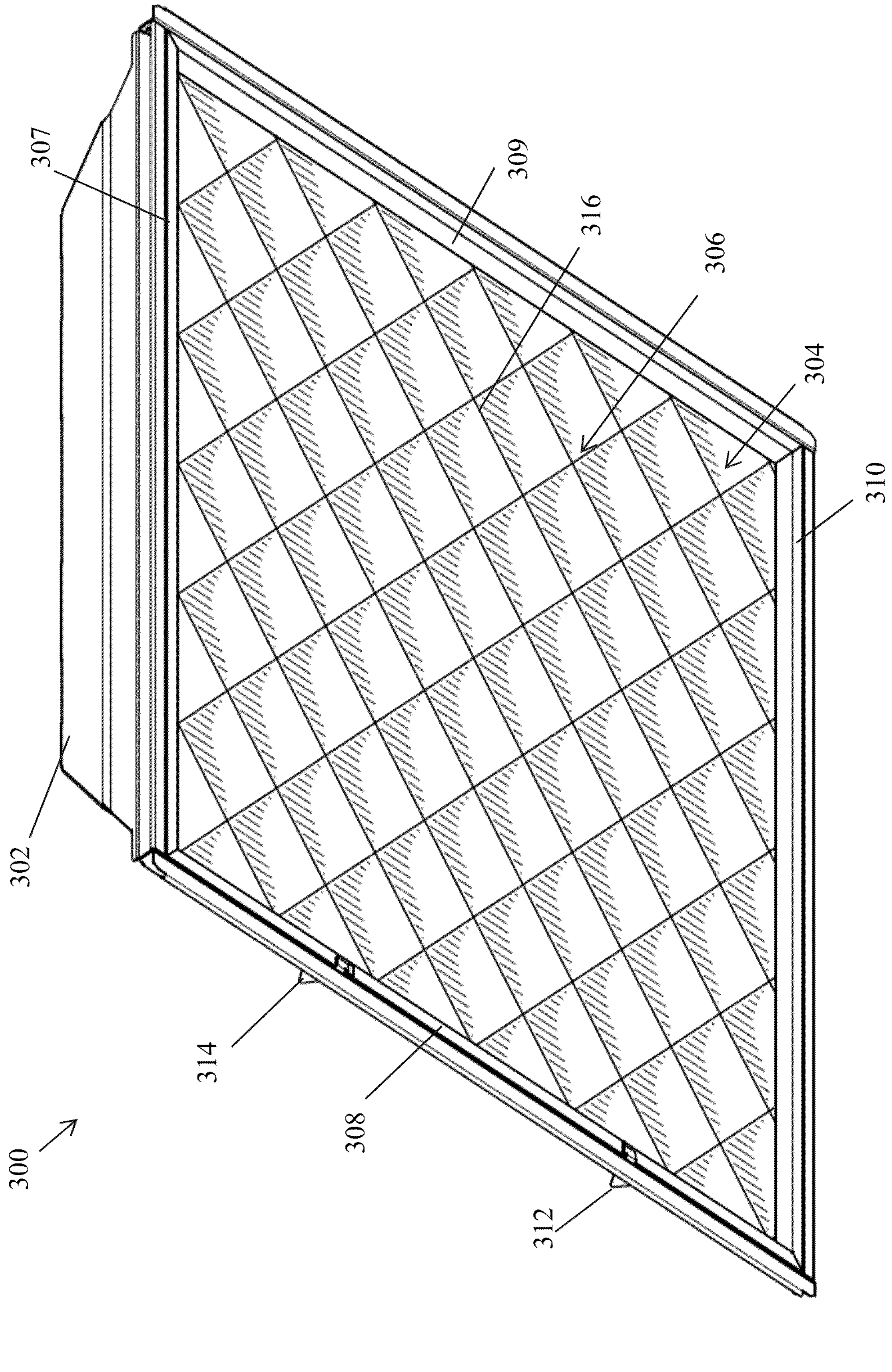
FIG. 8 illustrates a bottom perspective view of another luminaire with a three-dimensional pattern in accordance with certain example embodiments.

Referring now to FIGS. 7 and 8, example luminaires showing holographic three-dimensional patterns are illustrated. The holographic three-dimensional patterns were not shown in prior FIGS. 1-6 for the sake of clarity in the drawings. In FIG. 7, an example luminaire 200 comprises a housing 202 with a door frame 204 attached to a light emitting opening 206 of the luminaire. The housing 202 defines a cavity with a light source mounted to the inner top surface of the housing so that light is directed downward and out of the light emitting opening 206. The door frame 204 comprises a first side rail 208, a second side rail 209, a third side rail 207, and fourth side rail 210. As illustrated in FIG. 7, the second side rail 208 also comprises a first latch 212 and a second latch 214 for securing the door frame 204 to the housing 202. Although not shown in FIG. 7, the second side rail 209 can be attached to the housing with similar latches or with hinges or other coupling devices. Similar to the arrangement illustrated and described in connection with FIGS. 1-6, the door frame 204 supports a film stack 216 in the light emitting opening 206 of luminaire 200. The film stack 216 comprises a plurality of films including a diffuser film and a photopolymer film. The photopolymer film has embossed therein optical structures that create a holographic three-dimensional pattern such as the one shown in FIG. 7. In the example of FIG. 7, the diffuser film is placed closer to the light source inside the housing 202 and above the photopolymer film in the film stack 216. Optionally, the film stack 216 can also comprise a third film positioned below the photopolymer film and the third film can provide further light diffusing.

Referring to FIG. 8, another example luminaire 300 showing a different holographic three-dimensional pattern is illustrated. Example luminaire 300 comprises a housing 302 with a door frame 304 attached to a light emitting opening 306 of the luminaire. The housing 302 defines a cavity in which a light source is mounted to the inner top surface of the housing so that light is directed downward and out of the light emitting opening 306. The door frame 304 comprises a first side rail 308, a second side rail 309, a third side rail 307, and fourth side rail 310. As illustrated in FIG. 8, the second side rail 308 also comprises a first latch 312 and a second latch 314 for securing the door frame 304 to the housing 302. Although not shown in FIG. 8, the second side rail 309 can be attached to the housing with similar latches or with hinges or other coupling devices. Similar to the arrangement illustrated and described in connection with FIGS. 1-6, the door frame 304 supports a film stack 316 in the light emitting opening 306 of luminaire 300. The film stack 316 comprises a plurality of films including a diffuser film and a photopolymer film. The photopolymer film has embossed therein optical structures that create a holographic three-dimensional pattern such as the one shown in FIG. 8. In example luminaire 300, the diffuser film is placed closer to the light source inside the housing 302 and above the photopolymer film in the film stack 316. Optionally, the film stack 316 can also comprise a third film positioned below the photopolymer film and the third film can provide further light diffusing.

In certain example embodiments, the example luminaires are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. As another example, Underwriters Laboratories (UL) sets various standards for light fixtures, including standards for heat dissipation. Use of example embodiments described herein meet (and/or allow a corresponding device to meet) such standards when required.

Referring generally to the foregoing examples, any luminaires, or components thereof (e.g., housings or door frames), described herein can be made from a single piece (e.g., as from a mold, injection mold, die cast, 3-D printing process, extrusion process, stamping process, or other prototype methods). In addition, or in the alternative, a luminaire (or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

A fastener or coupling feature (including a complementary coupling feature) as described herein can allow one or more components and/or portions of an example door frame, housing, or other component of a luminaire to become coupled, directly or indirectly, to another portion of the example door frame, housing, or other component of a luminaire. A coupling feature can include, but is not limited to, a snap, a latch, Velcro, a clamp, a portion of a hinge, an aperture, a recessed area, a protrusion, a slot, a spring clip, a tab, a detent, and mating threads. One portion of an example heat sink can be coupled to a light fixture by the direct use of one or more fasteners or coupling features.

In addition, or in the alternative, a portion of a luminaire can be fastened or coupled using one or more independent devices that interact with one or more coupling features disposed on a component of the heat sink. Examples of such devices can include, but are not limited to, a pin, a hinge, a fastening device (e.g., a bolt, a screw, a rivet), epoxy, glue, adhesive, tape, and a spring. One coupling feature described herein can be the same as, or different than, one or more other coupling features described herein. A complementary coupling feature (also sometimes called a corresponding coupling feature) as described herein can be a coupling feature that mechanically couples, directly or indirectly, with another coupling feature.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Many modifications and other embodiments set forth herein will come to mind to one skilled in the art having the benefit of the teachings presented in the foregoing descriptions and the associated drawings. Therefore, it is to be understood that the example embodiments are not to be limited to the specific embodiments disclosed and that modifications and other embodiments are intended to be included within the scope of this application. Although specific terms are employed herein, they are used in a generic and descriptive sense only and not for purposes of limitation.

The invention claimed is:

1. A luminaire comprising:

a housing configured to be installed in a recess in a ceiling, the housing comprising an inner top surface to which a light source is mounted;

a frame attached to the housing, the frame comprising:

a first side rail;

a second side rail;

a third side rail;

a fourth side rail; and a film stack comprising a plurality of films, the film stack supported by the first side rail, the second side rail, the third side rail, and the fourth side rail, wherein the plurality of films comprises a photopolymer film with optical structures that provide a holographic three-dimensional pattern, a diffuser film, and a textured acrylic film, wherein the diffuser film is stacked on top of the photopolymer film, and the photopolymer film is stacked on top of the textured acrylic film such that the diffuser film is the closest of the plurality of films to the light source.

2. The luminaire of claim 1, further comprising a foam gasket placed between the frame and a top side of the film stack.

3. The luminaire of claim 1, wherein the first side rail, the second side rail, the third side rail, and the fourth side rail are joined to form a light emitting opening.

4. The luminaire of claim 1, wherein each of the first side rail, the second side rail, the third side rail, and the fourth side rail comprise a back flange, a side wall, and a front flange.

5. The luminaire of claim 4, wherein the back flange and the front flange form a gap into which a perimeter of the film stack is inserted.

6. The luminaire of claim 1, wherein the frame is a door frame and wherein the first side rail comprises a latch that fits through a slot in the housing to secure the door frame to the housing.

7. The luminaire of claim 6, wherein the second side rail is located on a side of the door frame opposite the first side rail, the second side rail comprising a hinge that attaches to an aperture in the housing.

8. The luminaire of claim 7, wherein the hinge and the latch are configured to permit opening of the door frame such that the door frame hangs by the hinge from the housing.

9. The luminaire of claim 6, wherein the door frame is removable so that a second door frame can be attached to the housing without removing the housing from the recess in the ceiling.

10. The luminaire of claim 4, wherein the front flange comprises a horizontal portion and an angled portion, the horizontal portion having an outer surface that is parallel with a plane defined by a light emitting opening of the housing, and the angled portion defining an outer acute angle between an outer surface of the angled portion and the plane defined by the light emitting opening of the housing and defining an inner obtuse angle between an inner surface of the horizontal portion of the front flange and an inner surface of the angled portion.

11. The luminaire of claim 1, wherein the first side rail is disposed in a first housing recess and the second side rail is disposed in a second housing recess, the first housing recess on an opposite side of the housing from the second housing recess.

12. The luminaire of claim 11, wherein a front flange of first side rail is co-planar with a first outer flange of the housing when the first side rail is disposed in the first housing recess.

* * * * *